(12) United States Patent
Yu

(10) Patent No.: US 11,783,785 B2
(45) Date of Patent: Oct. 10, 2023

(54) LED DEVICE HAVING DIODES CONTROLLED BY DIFFERENT SIGNALS, OPERATING METHOD OF THE SAME, AND DISPLAY DEVICE

(71) Applicant: AmTRAN Technology Co., Ltd., New Taipei (TW)

(72) Inventor: Hung-Ta Yu, New Taipei (TW)

(73) Assignee: AmTRAN Technology Co., Ltd., New Taipei (TW)

( * ) Notice: Subject to any disclaimer, the term of this patent is extended or adjusted under 35 U.S.C. 154(b) by 0 days.

(21) Appl. No.: 17/664,873

(22) Filed: May 25, 2022

(65) Prior Publication Data

US 2023/0215343 A1 Jul. 6, 2023

(30) Foreign Application Priority Data

Dec. 30, 2021 (TW) .................................. 110149735

(51) Int. Cl.
  *G09G 3/34* (2006.01)
  *G09G 3/32* (2016.01)
(52) U.S. Cl.
  CPC ............... *G09G 3/34* (2013.01); *G09G 3/32* (2013.01); *G09G 2320/0204* (2013.01); *G09G 2320/0233* (2013.01); *G09G 2320/0626* (2013.01); *G09G 2330/021* (2013.01)
(58) Field of Classification Search
  CPC .......... G09G 3/32; G09G 3/34; G09G 3/3406; G09G 2320/0233; G09G 2320/0626; G09G 2330/021; G09G 2320/0204
  See application file for complete search history.

(56) References Cited

U.S. PATENT DOCUMENTS

| 2001/0007360 A1* | 7/2001 | Yoshida | H01L 25/0753 257/89 |
| 2007/0126757 A1* | 6/2007 | Itoh | G09G 3/3258 345/690 |
| 2010/0103091 A1* | 4/2010 | Chen | G09G 3/3406 345/102 |
| 2014/0049172 A1* | 2/2014 | Bakk | H05B 45/20 315/192 |

(Continued)

FOREIGN PATENT DOCUMENTS

| CN | 206650895 U | 11/2017 |
| CN | 107481679 A | 12/2017 |
| CN | 109036293 A | 12/2018 |

(Continued)

*Primary Examiner* — Xuemei Zheng
(74) *Attorney, Agent, or Firm* — CKC & Partners Co., LLC

(57) ABSTRACT

A light emitting diode device is provided and includes a first light emitting diode(LED) package emitting light to generate a first brightness. The first LED package includes a first diode being driven in response to a pulse width modulation (PWM) current to generate a first portion of the first brightness and a second diode being driven in response to a first direct current (DC) current to generate a second portion of the first brightness. In a first operation mode of the LED device, the first diode and the second diode are enabled to make the first brightness to reach a first value. In a second operation mode, different from the first operation mode, of the LED device, the second diode is disabled to reduce the brightness from the first value to a second value.

18 Claims, 4 Drawing Sheets

(56) References Cited

U.S. PATENT DOCUMENTS

2019/0059136 A1* 2/2019 Navabi-Shirazi .......................... H05B 45/3725
2021/0298153 A1 9/2021 Hampel et al.

FOREIGN PATENT DOCUMENTS

TW 201031264 A1 8/2010
TW 202042594 A 11/2020

* cited by examiner

LED DEVICE HAVING DIODES CONTROLLED BY DIFFERENT SIGNALS, OPERATING METHOD OF THE SAME, AND DISPLAY DEVICE

CROSS REFERENCE

The present application claims priority to Taiwan Application Serial Number 110149735, filed on Dec. 30, 2021, which is herein incorporated by reference in its entirety.

BACKGROUND

Description of Related Art

Recently the direct type backlight modules with sub-millimeter light emitting diode (mini LED) are popular in the industry, which can make the display devices capable of displaying high dynamic range (HDR) images. Currently the backlight modules mainly utilize pulse width modulation (PWM) control signals for dimming control techniques in mini LEDs drivers. The driving currents of the PWM control signals are fixed at the maximum current values of the mini LEDs, and duty cycles of the PWM control signals are utilized to control the brightness of the mini LEDs. However, when the driving currents received by the mini LEDs are close to the critical current values of the mini LEDs, the wall-plug efficiency deteriorates due to the heat constantly generated by the mini LEDs, which makes the mini LEDs cannot emit light with maximum brightness. Therefore, when a HDR display device is required to display ultra-high brightness at certain regions of the display screen instantaneously, the mini LED backlight module driven by PWM signals cannot provide brightness value as high as that driven by DC power signals.

There are other solutions which implement DC power signals to drive the backlight light sources in backlight modules. However, these technologies are restricted by the large size and high cost of the transformers which are required to generate DC power signals. In addition, the associated components, such as MOSFETs, are required to meet higher requirements of safety regulations, which results in expensive costs and complex designs of the entire mini LED driving circuits. At the same time, the response time to drive and control mini LEDs' dimming with DC power signals is not as short as PWM control signals. Therefore, pure DC driver circuit designs for mini LEDs are too complex to be implemented in the ultra-high-brightness HDR display devices.

In summary, the conventional mini LED backlight modules cannot support the HDR display devices to enable different display modes for different regions on the display screen respectively, which is due to the deficiency of the driving circuit that cannot provide required brightness.

SUMMARY

One aspect of the present disclosure is to provide a light emitting diode (LED) device. The LED device includes a first light emitting diode(LED) package emitting light to generate a first brightness. The first LED package includes a first diode being driven in response to a pulse width modulation (PWM) current to generate a first portion of the first brightness and a second diode being driven in response to a first direct current (DC) current to generate a second portion of the first brightness. In a first operation mode of the LED device, the first diode and the second diode are enabled to make the first brightness to reach a first value in a larger value range. In a second operation mode, different from the first operation mode, of the LED device, the second diode is disabled to reduce the brightness from the first value to a second value in a smaller value range.

Another aspect of the present disclosure is to provide a method of operating a light emitting diode device including operations: enabling by a first control circuit, according to a first control signal, a second control circuit; outputting, by the second control circuit, a pulse width modulation current to multiple first LED diodes; and selectively enabling, by the first control circuit, according to the first control signal, multiple third control circuits, wherein each of the third control circuits is coupled to a corresponding one of multiple second LED diodes. The selectively enabling, by the first control circuit, according to the first control signal, the third control circuits includes operations: generating multiple second control signals, and enabling, in response to a first one of the second control signals, a first one of the third control circuits; and generating, by the first one of the third control circuits, a corresponding first direct current (DC) current to a first one of the second LED diodes. One of the first LED diodes and one of the second LED diodes are included in one of multiple LED packages.

Another aspect of the present disclosure is to provide a display device including a backlight module. The backlight module includes multiple light emitting diode (LED) packages. One of the LED packages includes a first diode being driven to emit light in response to a pulse width modulation (PWM) current and a second diode being driven to emit light in response to a direct current (DC) current. The backlight module includes a PWM signal generator generating the PWM current to control a light-emitting brightness of the first diode and a DC signal generator generating to generate the DC current to control a light-emitting brightness of the second diode. In a first operation mode of the display device, the first and second diodes are enabled simultaneously to emit light to illuminate a display region of the display device. In a second operation mode, different from the first operation mode, of the display device, the second diode is disabled and the first diode emits light to illuminate the display region of the display device.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The spirit of the present disclosure will be discussed in the following drawings and detailed description, and those of ordinary skill in the art will be able to change and modify the teachings of the present disclosure without departing from the spirit and scope of the present disclosure.

It should be understood that, in this document and the following claims, when an element is referred to as being "connected" or "coupled" to another element, it can be directly connected or coupled to another element, or there may be an intervening component. In contrast, when an element is referred to as being "directly connected" or "directly coupled" to another element, there is no intervening element. In addition, "electrically connected" or "connected" may also be used to indicate that two or more elements cooperate or interact with each other.

It should be understood that, in this document and the following claims, the terms "first" and "second" are to describe the various elements. However, these elements should not be limited by these terms. These terms are used to distinguish one element from another. For example, a first element may be termed a second element. Similarly, a second element may be termed a first element without departing from the spirit and scope of the embodiments.

It should be understood that, in this document and the following claims, the terms "include," "comprise," "having" and "has/have" are used in an open-ended fashion, and thus should be interpreted to mean "include, but not limited to."

It should be understood that, in this document and the following claims, the term "and/or" includes any and all combinations of one or more of the associated listed items.

It should be understood that, in this document and the following claims, unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 1:
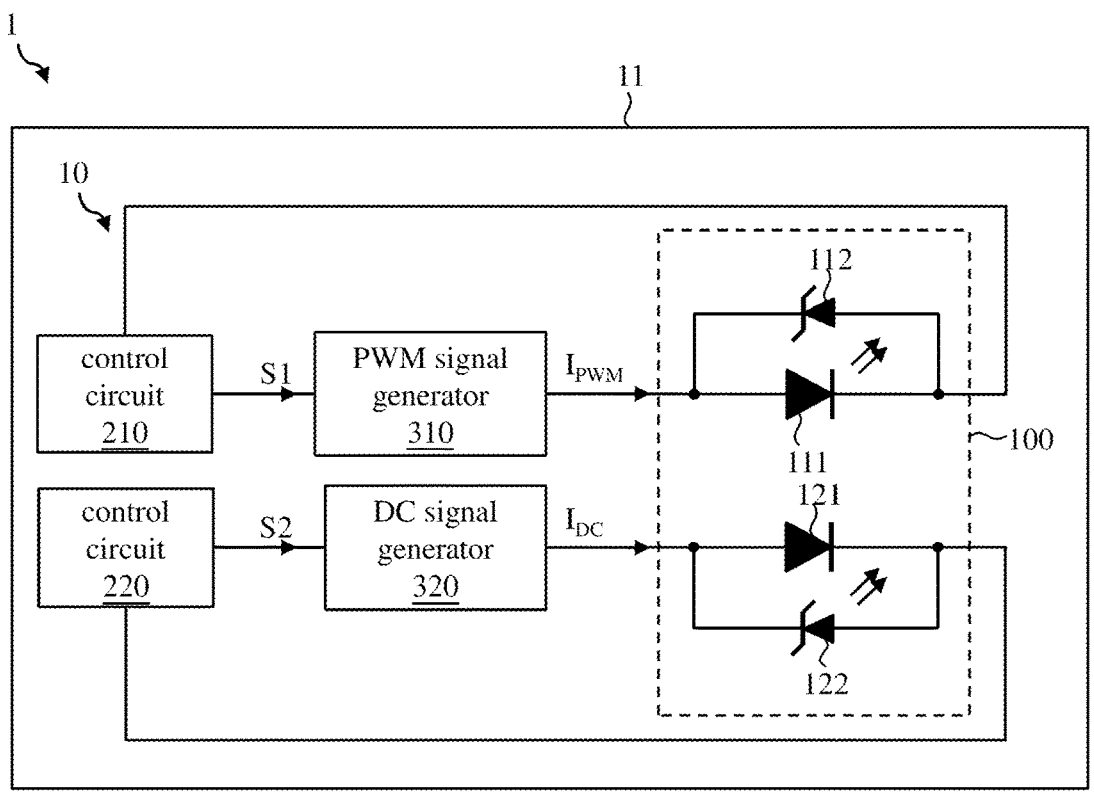
FIG. 1 illustrates a schematic diagram of a light emitting diode (LED) device 10 according to some embodiments of the present disclosure.

Reference is now made to FIG. 1. FIG. 1 illustrates a schematic diagram of a light emitting diode (LED) device 10 according to some embodiments of the present disclosure. As shown in FIG. 1, the LED device 10 includes a LED package 100, control circuits 210, 220, a pulse width modulation (PWM) signal generator 310, and a direct current (DC) signal generator 320. In some embodiments, the LED device 10 is one of the driver circuits in a backlight module 11 of a display device 1, wherein the LED package 100 is configured to generate desired brightness for illuminating a display panel in the display device 1. In other words, the backlight module according to some embodiments of the present disclosure includes a plurality of LED packages 100, wherein the LED packages 100 can be controlled to output desired brightness to corresponding regions on the display panel of the display device 1. For the sake of simplicity, FIG. 1 illustrates only one of the plurality of LED packages 100, which exemplarily introduces some embodiments of the present disclosure. However, it is to be understood that the present disclosure is not limited to the embodiments of FIG. 1.

As shown in FIG. 1, the LED package 100 includes LEDs 111, 121, and clamping diodes 112, 122. The LED 111 and the clamping diode 112 are coupled in parallel, and the LED 121 and the clamping diode 122 are coupled in parallel. In some embodiments, the LED 111 is configured to respond a PWM current signal $I_{PWM}$, which drives the LED 111 to generate a portion of the brightness of the LED package 100. The LED 121 is configured to respond a DC current signal $I_{DC}$, which drives the LED 121 to generate the other portion of the brightness of the LED package 100. In some embodiments, the LEDs 111 and 121 are mini light emitting diode (Mini LED) or other micro types of light emitting diode light source.

The clamping diodes 112, 122 are configured to provide overvoltage protection and voltage clamping to the components coupled to the LEDs 111 and 121. In some embodiments, the clamping diodes 112, 122 include Zener diodes.

The control circuit 210 is configured to generate a control signal S1 to the PWM signal generator 310, and the PWM signal generator 310 is configured to generate the PWM current $I_{PWM}$ in response to the control signal S1. The control circuit 220 is configured to generate a control signal S2 to the DC signal generator 320, and the DC signal generator 320 is configured to generate the DC current $I_{DC}$ in response to the control signal S2. The configurations of FIG. 1 are given for illustrative purposes. Various implements are within the contemplation of the present disclosure. For example, in some embodiments, the control circuit 210 has integrated PWM signal generator 310 and is configured to generate the PWM current $I_{PWM}$ to the LED 111, and the control circuit 220 has integrated DC signal generator 320 and is configured to generate the DC current $I_{DC}$ to the LED 121.

In some embodiments, the LED device 10 has multiple LED packages 100. In a general operation mode of the LED device 10, the LED device 10 provides uniform brightness to the display screen for displaying images, that is, there is no region on the display picture requiring particularly high brightness from the LED device 10. For example, the operating environment or message fields of a general information system may be displayed as on the display picture in the general operation mode. The LEDs 111 in all LED packages 100 are enabled and emit light in response to the PWM current $I_{PWM}$, such that the LED packages 100 emit light with a first brightness value. At the same time, the LEDs 121 in all LED packages 100 are disabled and do not emit light in the general operation mode. In other words, in the general operation mode of the LED device 10, the light-emitting brightness of the LED package 100 is the brightness generated by the LED 111. As the light-emitting brightness of the LED package 100 can be adjusted by modifying the PWM current $I_{PWM}$ in the general operation mode, it is equivalent to adjusting the brightness of the LED device 10.

In contrast, the LED device 10 generates ultra-high brightness corresponding to the display picture in the advanced operation mode of the display device 1. For example, when some regions of the LED device 10 are required to provide higher brightness than other regions, such as the display device is in HDR display mode, the advanced operation mode of the LED device 10 are enabled. The LEDs 111 and 121 of the LED package 100 corresponding to the display region requiring higher brightness are simultaneously enabled in the advanced operation mode, so the light-emitting brightness of the LED package 100 is increased from the first brightness value in the normal operation mode to a second brightness value, greater than the first brightness value, to provide relatively higher brightness for said display region. The LED device 10 may include multiple LED packages 100 in the advanced operation mode, and each of the LED packages 100 provides brightness with a corresponding second brightness value. In other words, the brightness of the LED device 10 increases when the LEDs 111 and 121 are simultaneously enabled. In another embodiment, the light-emitting brightness of the LED package 100 in the advanced operation mode is determined by the brightness of the LEDs 111 and 121. The light-emitting brightness of the LED package 100 can be adjusted by modifying the PWM current $I_{PWM}$ and also can be adjusted by modifying the DC current $I_{DC}$.

In some embodiments, the advanced operation mode of the display device 1 may include multiple display operation modes, such as picture-in-picture operation mode (PIP), Picture-by-Picture operation mode (PBP) or other display modes of divided screen regions, and the display device 1 may switch among the display operation modes following the users' operations. The display settings of each divided screen region can also be automatically or manually set, including local dimming, high dynamic range (HDR) or other settings of display modes and functions.

In another embodiment, when one or some certain display regions are switched from the advanced operation mode to the normal operation mode, the LEDs 121 in the LED packages 100 at the corresponding positions of certain display regions are disabled, such that the brightness of the LED packages 100 is reduced from the second brightness value to the first brightness value.

Figure 2:
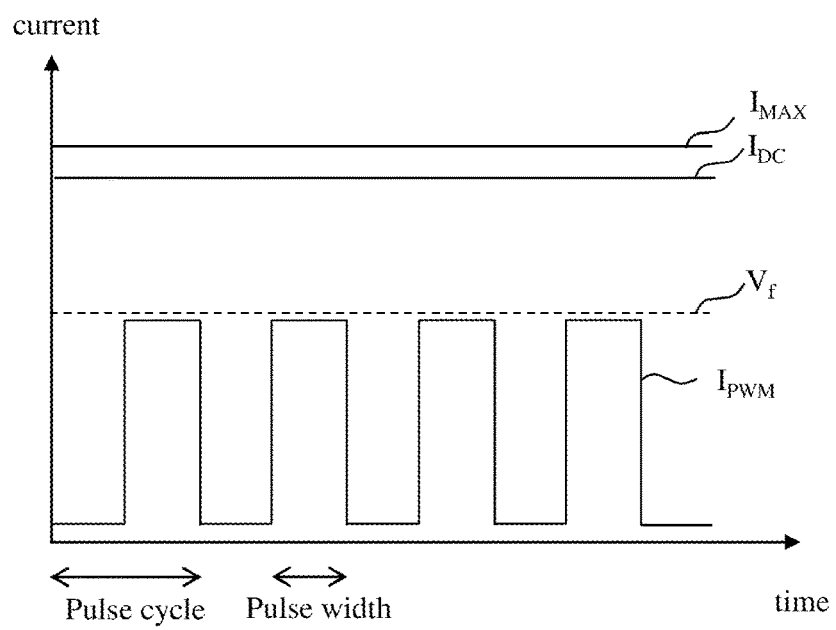
FIG. 2 illustrates a timing diagram of the PWM current $I_{PWM}$ and the DC current $I_{DC}$, corresponding to FIG. 1 in accordance with some embodiments of the present disclosure.

Reference is now made to FIG. 2. FIG. 2 illustrates a timing diagram of the PWM current $I_{PWM}$ and the DC current $I_{DC}$, corresponding to FIG. 1 in accordance with some embodiments of the present disclosure.

As mentioned above, the PWM current $I_{PWM}$ and the DC current $I_{DC}$ correspond to the LEDs 111 and 121 respectively. The PWM current $I_{PWM}$ is a pulse signal with duty cycles, and the brightness of the LED 111 can be controlled by adjusting the duty ratio of the PWM current $I_{PWM}$. For example, pulse widths in the cycles can be adjusted to modify the duty ratio. In addition, the brightness of the LED 121 can be modified by changing the magnitude of the DC current $I_{DC}$, and thus the that additional brightness of the LED diode 121 is provided with the brightness of the LED 111, such that ultra-high light emitting brightness required from the LED device 10 in the advanced operation mode can be achieved.

The prior art LED package in comparison has single LED chip that emits light in response to a PWM current, in which the PWM current is required to be approximate to the maximum operating current $I_{MAX}$ of the LED chip. If the display region which the prior art LED package corresponding to is switched to the normal operation mode or the advanced operation mode, the LED package can generate different brightness for the corresponding display region by adjusting the duty cycles of the PWM current. However, driving the LED chip to emit light with a current close to the maximum operating current $I_{MAX}$ will cause the LED chip to be constantly in the overdrive state. The operating voltage of the LED chip corresponding to the maximum operating current $I_{MAX}$ is at a relatively high voltage value, which not only causes high power consumption and heat dissipation issues of the LED chip, but also reduces wall-plug efficiency of the prior art LED package. Under such operating state, if the prior art LED backlight module is required to generate ultra-high brightness for displaying HDR pictures, the prior art LED backlight module has to provide the PWM current with full duty cycles to the prior art LED package. However, the LED chip cannot increase the light emitting brightness proportionally to full duty cycles and the wall-plug efficiency may be reduced by 20% to 30%.

Compared with the prior art, the backlight module proposed by the present disclosure drives only the LEDs 111 with the PWM current $I_{PWM}$ to provide light emitting brightness required for display picture in the normal operation mode, and additionally drives the LEDs 121 with the DC current $I_{DC}$ to compensate the light emitting brightness required for display picture in the advanced operation mode. The PWM current $I_{PWM}$ will be set within the range where the LED 111 has high wall-plug efficiency, which means that the LED 111 remains in the normal drive state with the current value of PWM current $I_{PWM}$ no matter how the duty cycles change. For example, the PWM current $I_{PWM}$ is significantly smaller than the maximum operating current $I_{MAX}$ as illustrated in FIG. 2, and the corresponding operating voltage $V_f$ is also smaller than the operating voltage in the prior art such that the LED 111 will not generate excessive heat. Accordingly, the LED device 10 of the present disclosure can emit light in an operating state with relatively low power consumption and significantly improved wall-plug efficiency.

The configuration of FIG. 1 is given for illustrative purposes, and embodiments of the present disclosure are not limited to the embodiments of FIG. 1. For example, in some embodiments, the LED package 100 may include a plurality of LEDs 111 connected in parallel with each other or/and a plurality of LEDs 121 connected in parallel with each other. Likewise, the configuration of FIG. 2 is given for illustrative purposes, and embodiments of the present disclosure are not limited to the example of FIG. 2. For example, in some embodiments, the current value of the DC current $I_{DC}$ may be less than, greater than, or equal to the PWM current $I_{PWM}$.

Figure 3:
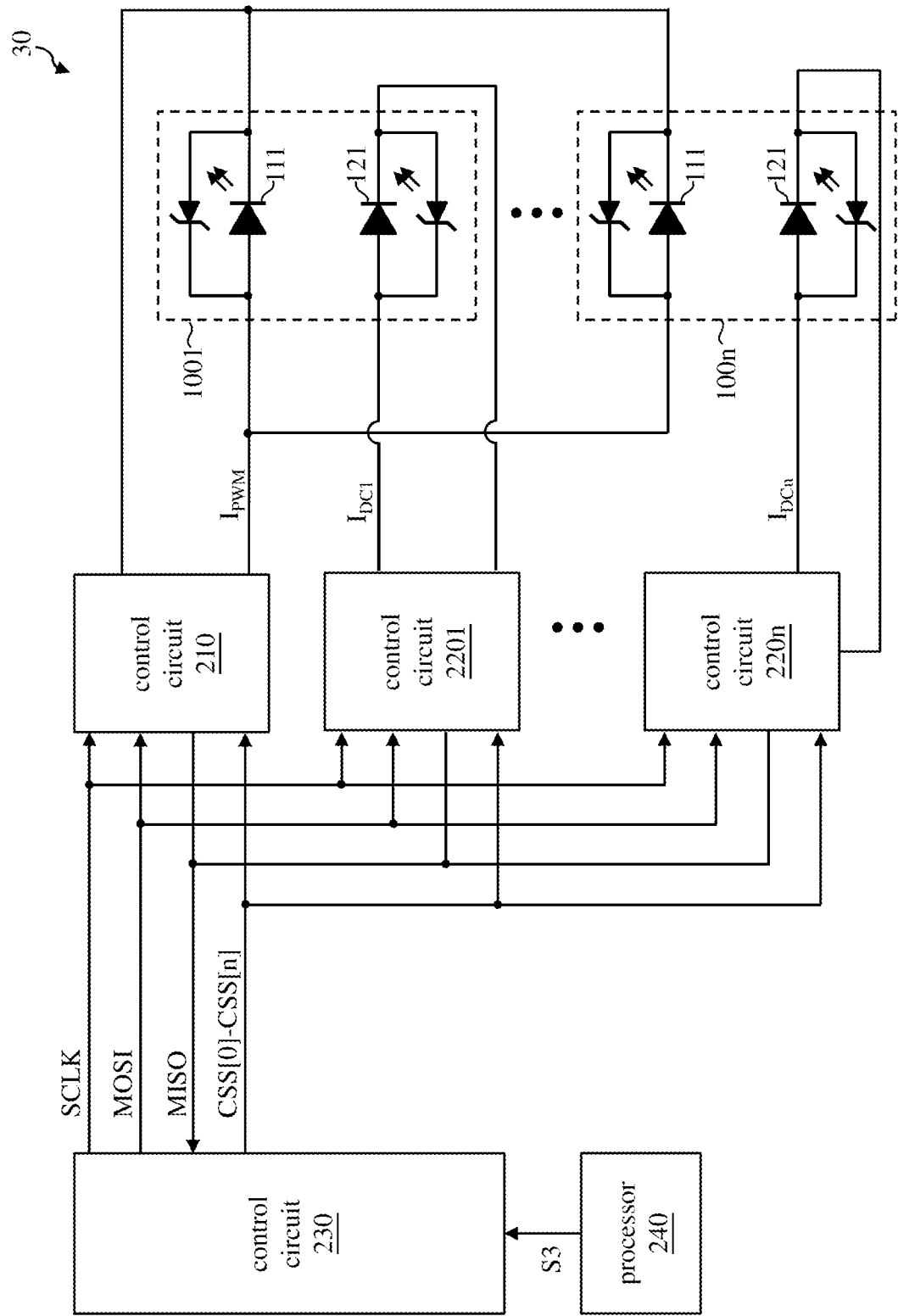
FIG. 3 illustrates a schematic diagram of a LED device 30 derived from the LED device 10 of FIG. 1, according to some embodiments of the present disclosure.

Reference is now made to FIG. 3. FIG. 3 illustrates a schematic diagram of a LED device 30 derived from the LED device 10 of FIG. 1, according to some embodiments of the present disclosure. With respect to the embodiments of FIGS. 1-2, similar components in FIG. 3 are designated with the same reference numerals for ease of understanding. For the sake of brevity, the specific operations of similar components that have been discussed in detail in the preceding paragraphs are omitted herein. Unless there is a need to introduce a cooperative relationship with the components shown in FIG. 3, the descriptions are repeated herein.

The LED device 30 includes the control circuit 210, control circuits 2201 to 220*n*, control circuit 230, a processor 240, and LED packages 1001 to 100*n*, in which n is a positive integer. In some embodiments, each of the control circuits 2201 to 220*n* corresponds to one of the LED packages 1001 to 100*n* respectively as a group, and the relationship of each group is configured with respect to, for example, the relationship of the control circuit 220 and the LED package 100 in FIG. 1. In some embodiments, the processor 240 is included in the control circuit 230.

As shown in FIG. 3, the control circuit 210 is coupled to the LEDs 111 in the LED packages 1001 to 100*n*. Each of the control circuits 2201-220*n* is coupled to the LED 121 within a corresponding one of the LED packages 1001-100*n* respectively. In other words, the control circuit 210 outputs all PWM currents $I_{PWM}$ to drive all the LEDs 111 in the LED device 10. The control circuits 2201 to 220*n* separately output the direct currents $I_{DC1}$ to $I_{DCn}$, to drive the LEDs 121 in the corresponding one of the LED packages 1001 to 100n.

Following to the above-described embodiments, each LED 111 in each of the LED packages 1001-100n is configured to be driven to generate a portion of the brightness of the corresponding one of the LED packages 1001-100n. Each LED 121 in each of the LED packages 1001-100n is configured to be driven to generate another portion of the brightness of the corresponding one of the LED packages 1001-100n.

In some embodiments, the control circuit 230 and the control circuits 210, 220 or 2201 . . . 220n are connected with serial peripheral interface (SPI) links. The control circuit 230 is configured to generate, in response to a control signal S3, a serial clock pulse SCLK, a master-output-slave-input signal MOSI and the control signals CSS[0] to CSS[n], and to output above signals to the control circuit 210 and the control circuits 2201 to 220n. In some embodiments, the control circuit 210 and the control circuits 2201 to 220n feedback slave-output-master-input signals MISO to the control circuit 230 respectively.

In some embodiments, the control circuit 210 is enabled or disabled in response to the control signal CSS[0], and the control circuits 2201 to 220n are separately enabled or disabled in response to the control signals CSS[1] to CSS[n]. Then, the control circuit 210 and the control circuits 2201 to 220n operate in response to the serial clock SCLK to generate the corresponding PWM current $I_{PWM}$ and the DC currents $I_{DC1}$ to $I_{DCn}$, according to the master-output-slave-input signal MOSI. In addition, the control circuit 210 and the control circuits 2201 to 220n feedback the voltage difference of the LEDs 111 and 121 in the slave-output-master-input signals MISO to the control circuit 230, such that the voltages can be instantly adjusted based on the slave-output-master-input signal MISO. By this way, the current flowing through the LEDs 111 and 121 can be further stabilized.

In some embodiments, the processor 240 is configured to generate the control signal S3 according to a user input, e.g., an instruction to switch the operation mode of the display device having LED device 30. In other embodiments, the processor 240 is configured to analyze the positions of the LEDs 121 to be enabled in the operation mode and generate the control signal S3 accordingly to the corresponding control circuit 210. The configuration of FIG. 3 is given for illustrative purposes. Various implementations of FIG. 3 are within the contemplation of the embodiments of the present disclosure. For example, in some embodiments, processor 240 is integrated in the control circuit 230.

For example, when the processor 240 determines that certain positions on the display screen are switched to the normal operation mode, where certain LED device 30 is corresponding to, the control signal S3 is generated to indicate that the corresponding LED device 30 is switched to the normal operation mode. Sequentially, the control circuit 230 generates the control signal CSS[0], e.g., having a first value as logic value 0, in response to the control signal S3 to enable the control circuit 210, and generates the control signals CSS[1] to CSS[n], e.g., having a second value as logic value 1, to disable the control circuits 2201 to 220n.

Following to the above-described embodiments, when the processor 240 determines that certain positions on the display screen are switched to the advanced operation mode, where certain LED device 30 is corresponding to, the processor 240 generates the control signal S3 to indicate that the corresponding LED device 30 is switched from the normal operation mode to the advanced operation mode. The control circuit 230 adjusts, in response to the control signal S3, the control signals CSS[1] to CSS[n], e.g., to have the first value as logic value 0, to enable the control circuits 2201 to 220n.

In other embodiments, when the processor 240 determines that certain positions on the display screen are dark screen regions, where certain LED device 30 is corresponding to, the processor 240 generates the control signal S3 to indicate that the corresponding LED device 30 is switched to the dark screen mode. The control circuit 230 adjusts, in response to the control signal S3, the control signals CSS[0] to CSS[n], e.g., to have the second value as logic 1, to disable the control circuits 210, 2201 to 220n.

In some embodiments, the control circuit 230 is a serial peripheral interface (SPI) master circuit, and the control circuits 210, 2201 to 220n are SPI slave circuits. However, the present disclosure is not limited to this, the control circuit 230 and the control circuits 210, 2201 to 220n can be other synchronous communication interface circuit components with the same or similar functions. In some embodiments, the control circuit 230 includes a mainboard with functions such as calculations and feedback controls, or a circuit for motion estimation and motion compensation (MEMC.)

The configuration of FIG. 3 is given for illustrative purposes. Various implementations of FIG. 3 are within the contemplation of the embodiments of the present disclosure. For example, in some embodiments, the logic values of the control signals CSS[0] to CSS[n] for disabling the control circuits 210, 2201 to 220n are "0", and those for enabling the control circuits 210, 2201 to 220n are "1". In other embodiments, the control signals CSS[0] to CSS[n] may have other configurations.

Figure 4:
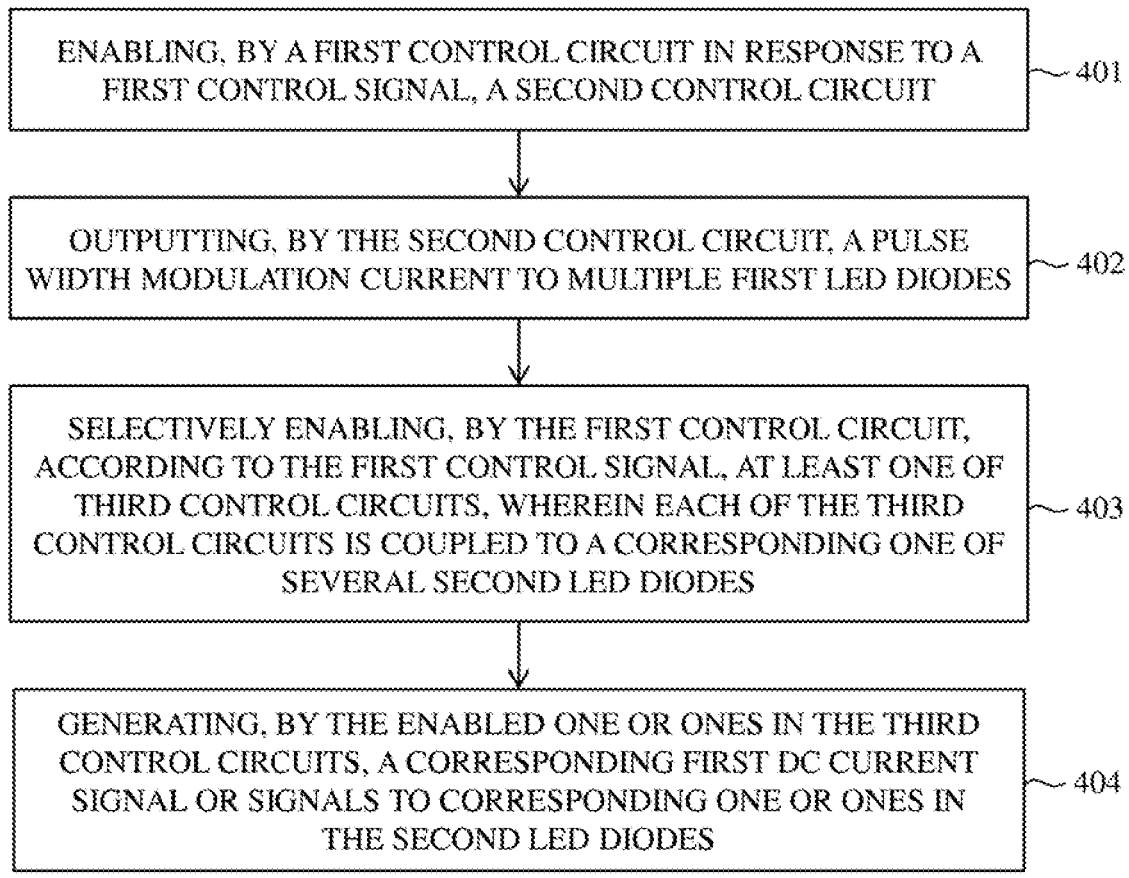
FIG. 4 illustrates a flowchart of an operation process 400 of the LED device according to some embodiments of the present disclosure.

Reference is now made to FIG. 4. FIG. 4 illustrates a flowchart of a operation process 400 of the LED device according to some embodiments of the present disclosure. It should be understood that additional operation steps may be provided before, during, and after the process shown by FIG. 4, and that some of the operation steps described below may be replaced, combined or eliminated as additional embodiments of the operation process. The order of these operation steps may be interchangeable. The similar elements in the following descriptions will be denoted by the similar reference numerals throughout the various views and the illustrative embodiments. The operation process 400 of the LED device includes operation steps 401 to 404 described below with reference to the LED devices 10, 30 of FIGS. 1-3.

In operation step 401, referring to FIG. 3, the control circuit 210 is enabled by the control circuit 230 in response to the control signal S3. For example, in some embodiments, when the processor 240 determines that certain positions of the display screen are switched to the advanced operation mode, the processor 240 generates the control signal S3 to indicate that the corresponding LED device 30 is switched to the advanced operation mode. The control circuit 230 therefore enables the control circuit 210. In some embodiments, the processor 240 generates the control signal S3 to indicate the corresponding positions of the LEDs, required to switch the operation mode, in the LED device 30.

In operation step 402, the control circuit 210 outputs the PWM current $I_{PWM}$ to the LEDs 111 in the LED packages 1001 to 100n.

Next, in operation step 403, the control circuit 230 selectively enables at least one of the control circuits 2201 to 220n according to the control signal S3, wherein each of the control circuits 2201 to 220n is coupled to the corresponding one of the LEDs 121. For example, when the control signal S3 further indicates that the brightness of the display screen region corresponding to the LED package 1003 needs to be enhanced, for example, providing ultra-high brightness to the display screen region for displaying HDR image, the control circuit 230 drives the control circuit 2203 that is coupled to the LED package 1003 and disables the rest of the control circuits 2201 to 220*n*.

Following operation step 403, in operation step 404, the selectively enabled one or ones in the control circuits 2201 to 220*n* generate corresponding DC current signal or signals to the corresponding one or ones in the LEDs 121. Following to the above embodiment, the enabled control circuit 2203 generates the corresponding DC current signal $I_{DC3}$ to the LED 121 in the LED package 1003 which drives the LED 121 to compensate the required brightness.

In some embodiments, when the control signal S3 indicates that one or some of the display screen regions are switched to the general operation mode as described above, the operation process 400 of the LED device further includes a step that the control circuit 230 disables, according to the control signal S3, one(s), of the control circuits 2201 to 220*n*, that correspond to the display screen region(s) switched to the general operation mode, and the brightness emitted by the LED package(s) at the corresponding position(s) is therefore the first brightness value. The control circuit 230 can still adjust the duty cycles of the PWM signal to adjust the brightness provided by the LED package(s) at the corresponding position(s) to the corresponding display screen region(s), so that in the normal mode, improved local dimming of the display screen regions can still be achieved. When the control signal S3 indicates that one or some LED packages of the LED device 30 are switched to the above-mentioned advanced operation mode, the operation process 400 of the LED device further includes a step that the control circuit 230 enables the control circuit(s), in the control circuits 2201 to 220*n*, corresponding to certain display screen region(s), which can raise the brightness emitted by the LED package(s) at the corresponding position(s) from the first value to the second value different from the first value. The control circuit 230 can adjust both the duty cycles of the PWM signal and the DC signal to adjust the brightness provided by the LED package(s) to the corresponding display screen region(s). Therefore in the advanced operation mode, improved local dimming with larger range of brightness values can be provided to the display screen regions.

According to some embodiments of the present disclosure, the operation process 400 of the LED device further includes the operation step of generating the control signal S3 according to the number of the LED packages 100 correspond to a sub-picture region on the display screen of the display device. According to another embodiment of the present disclosure, the operation process 400 of the LED device further includes the operation step of generating the control signal S3 according to the brightness distribution, which needs the LED device 30 to provide, of the display image. The above-mentioned operation steps will be described below with reference to the embodiments shown in FIGS. 5 to 7 separately.

Figure 5:
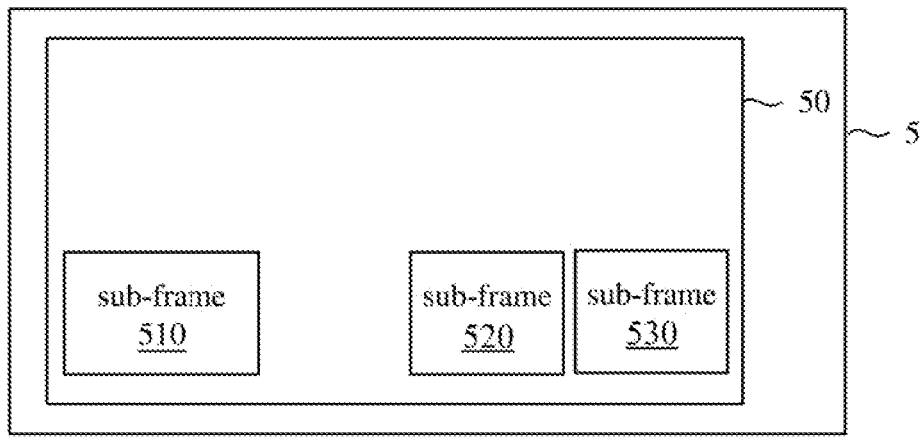
FIG. 5 is an exemplary view of a display device 5 according to embodiments of the present disclosure.

Reference is now made to FIG. 5. FIG. 5 is an exemplary view of a display device 5 according to embodiments of the present disclosure. In some embodiments, the LED device 50 is configured with respect to, for example, the LED device 10 or the LED device 30. The display device 5 is configured with respect to, for example, the display device 1 in FIG. 1.

As shown in FIG. 5, the display screen includes sub-picture regions 510 to 530, and the LED device 50 provides the brightness required for different regions on the display screen. In some embodiments, the position of each of the sub-picture regions 510 to 530 corresponds to multiple LED packages 100. In some embodiments, the sub-picture regions 510 to 530 are dynamically generated by the display device 5 on the display screen, and the display contents of these display regions may be provided by TV channels, DVD players, game devices, mobile devices, streaming media webpages or applications, video conferences applications, option menu of the display device, computer operation system, instance internet messages, emails, etc. The number, size and position of the sub-pictures are dynamically determined and generated based on the display contents received by the display device 5 and the display option settings of the display device 5, and the sub-picture regions dynamically correspond to the LED packages in the corresponding regions of the LED device 50. Accordingly, the LED packages in the regions corresponding to the sub-picture regions can provide brightness required for displaying various display contents. For example, given the display device 5 in an advanced operation mode, such as a picture-in-picture(PIP) operation mode, when the brightness required for at least one of the sub-picture regions 510 to 530 is higher than a certain value, or the display setting of the at least one of the sub-picture regions 510 to 530 is to enable ultra-high brightness, for example, enable the HDR display mode, the LED packages of the LED device 50 corresponding to the ultra-high brightness sub-picture region will be switched to the advanced operation mode. Moreover, the position, size and number of the sub-picture regions may be dynamically adjusted, for example, a new sub-picture region may be added into the display screen or an existed sub-picture region may be reduced or minimized in size, which may make other sub-picture regions change in size or shift to other position. The LED packages will also be mapped to the sub-picture regions in real-time and the operation mode of the LED packages will also be adjusted accordingly.

Figure 6:
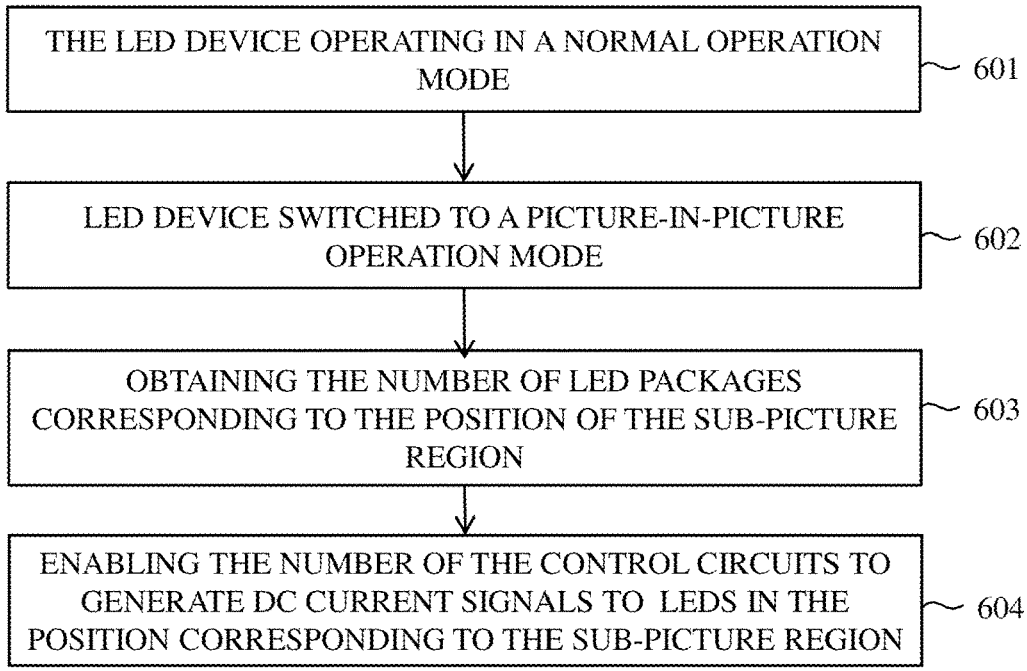
FIG. 6 illustrates a flowchart of an operation process 600 of a LED device according to the embodiments of the present disclosure.

Reference is now made to FIG. 6. FIG. 6 illustrates a flowchart of a operation process 600 of a LED device according to the embodiments of the present disclosure. It should be understood that additional operation steps may be provided before, during, and after the process shown by FIG. 6, and that some of the operation steps described below may be replaced, combined, or eliminated for additional embodiments of the operation process. The order of these operation steps may be interchangeable. The similar elements in the following descriptions will be denoted by the similar reference numerals throughout the various views and the illustrative embodiments. The operation process 600 of a LED device includes operation steps 601 to 604 described below with reference to the LED devices 10, 30, 50 of FIGS. 1-5.

In operation step 601, the LED device 50 is in a normal operation mode.

In operation step 602, the LED device 50 is switched to a picture-in-picture operation mode. For example, in some embodiments, the LED device 50 provides the brightness required by the display device 5 and an input for switching to the picture-in-picture display mode is obtained through an on-screen display settings of the display device 5. In other embodiments, the control signal S3 indicates the input for display mode switching.

In operation step 603, the processor 240 generates the control signal S3 according to the number of the LED packages 100 in the position corresponding to the sub-picture regions, e.g., sub-picture region 530, of the LED device 50. Following to the descriptions of the above embodiments, when the processor 240 analyzes that the sub-picture region 530 is designated to receive high brightness in order to display certain information, the processor 240 further obtains the number of LED packages corresponding to the position of the sub-picture region 530. For example, a total of 30 LED packages 1001 to 10030 in the embodiment of FIG. 3 may be disposed in the position corresponding to the sub-picture region 530.

In operation step 604, the number of the control circuits are enabled to generate the number of DC current signals to the LEDs in the position corresponding to the sub-picture region respectively. Following to the above-mentioned embodiments, the control circuits, for example, 2201 to 2230 coupled to the LED packages 1001 to 10030 are enabled to generate DC currents $I_{DC1}$ to $I_{DC30}$ to drive the LEDs 121 in the LED packages 1001 to 10030 respectively. Therefore, the sub-picture region, for example, 530 receives higher brightness than other regions receiving brightness from the LED device 50 due to additional light emitted by the driven LEDs 121 therein.

Figure 7:
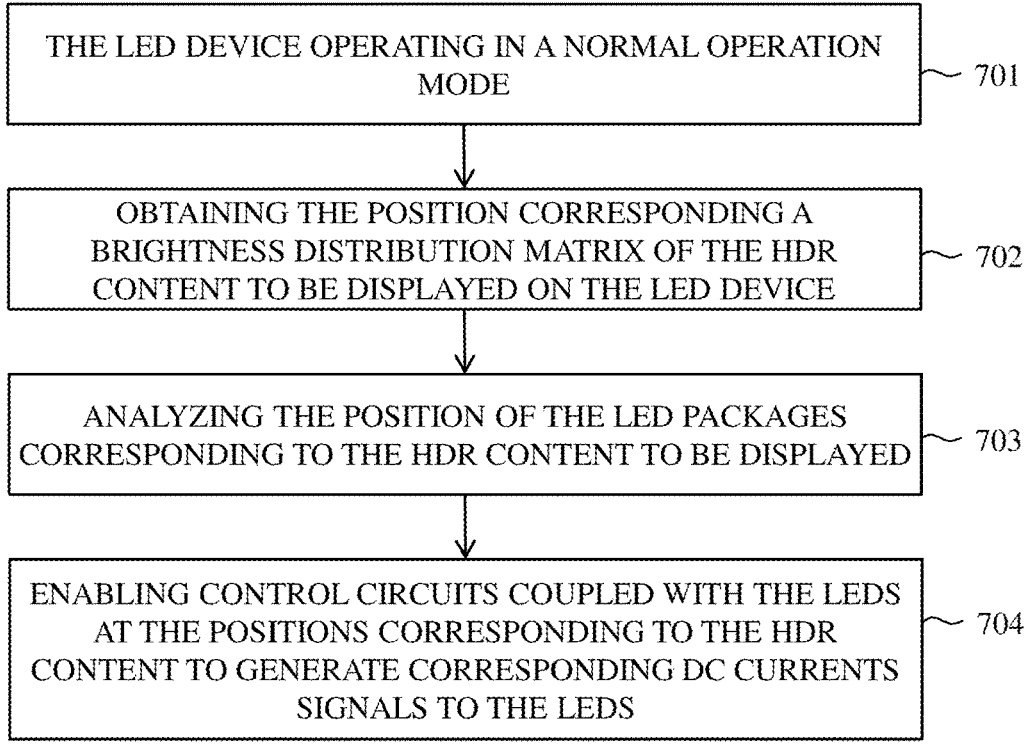
FIG. 7 illustrates a flowchart of an operation process 700 of a LED device according to embodiments of the present disclosure.

Reference is now made to FIG. 7. FIG. 7 illustrates a flowchart of an operation process 700 of a LED device according to embodiments of the present disclosure. It should be understood that additional operation steps may be provided before, during, and after the process shown by FIG. 7, and that some of the operation steps described below may be replaced, combined or eliminated as additional embodiments of the operation process. The order of these operation steps may be interchangeable. The similar elements in the following descriptions will be denoted by the similar reference numerals throughout the various views and the illustrative embodiments. The operation process 700 of a LED device includes operation steps 701 to 704 described below with reference to the LED devices 10, 30, 50 of FIGS. 1-5.

In operation step 701, the LED device 50 is in a normal operation mode.

In operation 702, the LED device 50 is switched to the high dynamic range (HDR) operation mode, and the processor 240 processes the algorithm to analyze which contents to be displayed include HDR content and obtain the position corresponding a brightness distribution matrix of the HDR content to be displayed on the LED device 30 as the control signal S3 to be transmitted to the control circuit 230.

In operation step 703, the control circuit 230 analyzes the position of the LED packages corresponding to the HDR content to be displayed. For example, the HDR content to be displayed indicates the dynamically brightness enhanced pixels on the display screen, and the control circuit 230 then analyzes the LED packages corresponding to those pixels.

In operation step 704, the control circuit 230 enables the control circuit, e.g., a set of the control circuits 2201-220n, coupled with the LEDs at the positions corresponding to the HDR content to generate corresponding DC current signals to the LEDs 121. For example, the LED packages 1001 to 10010 in a region of the LED device 30 correspond to the dynamically brightness enhanced pixels. The control circuit 230 generates a set of the control signals CSS[1] to CSS[10], e.g., with logic value 0, to enable a set of the control circuits 2201 to 22010. The remaining LED packages 10011 to 100n in other regions of the LED device 30, which are separated from the aforementioned region, do not correspond to the dynamically brightness enhanced pixels. Accordingly the control circuit 230 generates another set of the control signals CSS[11] to CSS[n], e.g., with logic value 1, to disable another set of the control circuits 22011 to 220n.

In some embodiments, the operation process 700 of the LED device further includes an operation step of generating the DC current signals $I_{DC1}$ to $I_{DC10}$ to the LED packages 1001 to 10010 through the enabled control circuits 2201 to 22010.

Following the aforementioned embodiments, the operation process 700 of the LED device further includes an operation step of raising the DC current value of the DC signal in response to an increase in the brightness at the region of the LED device 30 corresponding to the pixels displaying the HDR content on the display screen. For example, when the control signal S3 indicates that the brightness at the pixel region corresponding to the HDR content is increased from the first value to the second value, the control circuit 230 drives the corresponding control circuits, for example, 2201 to 22010, to increase the DC currents of DC current signals $I_{DC1}$ to $I_{DC10}$, thereby increasing the brightness provided by the LED packages in corresponding region of the LED device.

In summary, the LED device and its operation process proposed in the present disclosure provide a LED package with two LEDs which are respectively driven by a PWM current signal and a DC current signal. Through bidirectional high-speed communication signals between master and slave circuits of the serial peripheral interface, the LED driven by the PWM current signal is enabled in the general operation mode, which provides brightness in a smaller value range, and the two LEDs in the LED package are simultaneously enabled in the advanced operation mode, which can provide higher maximum brightness in a larger value range. By this way, the requirement of high brightness in the advanced operation modes, for example, HDR displaying mode, can be fulfilled, and displaying reminding message on the display screen under the PIP mode can be achieved. In addition, the problem of low wall-plug efficiency of the LEDS caused by high PWM current conditions can be solved. According to the hybrid configurations of the present disclosure, the size of associated transformer and the size and cost of associated electrical components are further reduced.

While the disclosure has been described by way of example(s) and in terms of the preferred embodiment(s), it is to be understood that the disclosure is not limited thereto. Those skilled in the art may make various changes, substitutions, and alterations herein without departing from the spirit and scope of the present disclosure. In view of the foregoing, it is intended that the present disclosure cover modifications and variations of this disclosure provided they fall within the scope of the following claims.

What is claimed is:

1. A light emitting diode device, comprising:
a first light emitting diode(LED) package being capable of emitting light with a first maximum brightness value, and comprising:
a first diode configured to be driven in response to a pulse width modulation (PWM) current to generate a first portion of the emitted light of the first LED package;
a second diode configured to be driven in response to a first direct current (DC) current to generate a second portion of the emitted light of the first LED package;
a first control circuit configured to generate and output the PWM current, in response to a first control signal, to the first diode;
a second control circuit configured to generate and output the first DC current, in response to a second control signal, to the second diode; and a third control circuit configured to generate the first and second control signals in response to a third control signal, wherein the third control signal is associated with switching an operation mode of the LED device, wherein in a first operation mode of the LED device, both of the first diode and the second diode are enabled to emit light that can reach the first maximum brightness value in a first value range, and the PWM current is less than a maximum current value of the first DC current, and wherein in a second operation mode, different from the first operation mode, of the LED device, the second diode is disabled and the first diode emits light that can reach a second maximum brightness value in a second value range, and the second value range is smaller than the first value range.

2. The light emitting diode device of claim 1, wherein in the first operation mode, the second control signal has a first logic value, and in the second operation mode, the second control signal has a second logic value different from the first logic value.

3. The light emitting diode device of claim 1, wherein the second control circuit is a serial peripheral interface slave circuit, and the third control circuit is a serial peripheral interface master circuit.

4. The light emitting diode device of claim 1, further comprising:

a plurality of second LED packages each configured to emit light to generate a corresponding second brightness and comprising:

a third diode configured to be driven in response to the PWM current to generate a first portion of the second brightness;

a fourth diode configured to be driven in response to a second DC current to generate a second portion of the second brightness;

wherein the LED device further comprises:

the first control circuit coupled to the first diode in the first LED package and the third diodes in the plurality of second LED packages, and configured to output the PWM current to the first diode and the third diodes in the plurality of second LED packages; and wherein the second control circuit further comprises a plurality of second control circuits, wherein a first one of the second control circuits is coupled to the second diode in the first LED package and configured to output the first DC current to the second diode, wherein each one in the rest of the plurality of second control circuits is coupled to the fourth diode in one of the plurality of second LED packages, and configured to output a corresponding second DC current to the fourth diode.

5. The light emitting diode device of claim 4, further comprising:

the third control circuit configured to enable, in the first operation mode and the second operation mode of the LED device respectively, the first control circuit to generate the PWM current and the second control circuits to generate the first DC current and the corresponding second DC current, and configured to disable, in the second operation mode of the LED device, the plurality of second control circuits.

6. The light emitting diode device of claim 5, wherein the first control circuit and the second control circuits are respectively a first serial peripheral interface slave circuit and second serial peripheral interface slave circuits, and the third control circuit is a serial peripheral interface master circuit.

7. The light emitting diode device of claim 1, wherein the first LED package further comprises:

a first zener diode coupled in parallel with the first diode; and a second zener diode coupled in parallel with the second diode.

8. A method of operating a light emitting diode device, comprising:

enabling by a first control circuit, according to a first control signal, a second control circuit;

outputting, by the second control circuit, a pulse width modulation(PWM) current to a plurality of first LED diodes; and selectively enabling, by the first control circuit, according to the first control signal, a plurality of third control circuits, wherein each of the plurality of third control circuits is coupled to a corresponding one of a plurality of second LED diodes, wherein selectively enabling, by the first control circuit, according to the first control signal, the plurality of third control circuits comprises:

generating a plurality of second control signals, and enabling, in response to a first one of the plurality of second control signals, a first one of the plurality of third control circuits; and generating, by the first one of the plurality of third control circuits, a corresponding first direct current (DC) current to a first one of the plurality of second LED diodes;

wherein one of the plurality of first LED diodes and one of the plurality of second LED diodes are included in one of a plurality of LED packages.

9. The method of operating the light emitting diode device of claim 8, further comprising:

generating the first control signal according to a brightness distribution of the LED device;

wherein selectively enabling, by the first control circuit, according to the first control signal, the plurality of third control circuits further comprises:

generating, according to the first control signal, a first group of signals, having a first logic value, in the plurality of second control signals, to enable a first group of circuits in the plurality of third control circuits; and generating, according to the first control signal, a second group of signals, having a second logic value different from the first logic value, in the plurality of second control signals, to enable a second group of circuits in the plurality of third control circuits;

wherein the first group of circuits in the plurality of third control circuits correspond to a first region of the LED device, and the second group of circuits in the plurality of third control circuits correspond to a second region, separate from the first region, of the LED device.

10. The method of operating the light emitting diode device of claim 9, further comprising:

generating, by the first group of circuits in the plurality of third control circuits, a plurality of second DC currents to corresponding second LED diodes; and in response to an increase of a brightness of the second region of the LED device, raising the plurality of second DC currents.

11. The method of operating the light emitting diode device of claim 9, further comprising:
controlling a brightness of the second region of the LED device by the plurality of second control signals.

12. The method of operating the light emitting diode device of claim 8, wherein selectively enabling, by the first control circuit, according to the first control signal, the plurality of third control circuits further comprises:
in a first operation mode of the LED device, disabling each one in the plurality of third control circuits, wherein a brightness of the LED device has a first value; and
in a second operation mode of the LED device, raising the brightness of the LED device to a second value different from the first value by enabling a number of circuits in the plurality of third control circuits.

13. The method of operating the light emitting diode device of claim 8, wherein the first control circuit and the second control circuit are serial peripheral interface circuits.

14. The method of operating the light emitting diode device of claim 8, further comprising:
generating the first control signal according to a brightness distribution of the LED device, wherein the brightness distribution is associated with a high dynamic range (HDR) content.

15. A display device, comprising:
a backlight module, comprising:
a plurality of first light emitting diode (LED) packages, wherein one of the plurality of first LED packages comprises:
a first diode configured to be driven to emit light in response to a pulse width modulation (PWM) current;
a second diode configured to be driven to emit light in response to a first direct current (DC) current;
a plurality of second light emitting diode (LED) packages, wherein one of the plurality of second LED packages comprises:
a third diode configured to be driven to emit light in response to the pulse width modulation (PWM) current;
a fourth diode configured to be driven to emit light in response to a second direct current (DC) current;
a PWM signal generator configured to generate the PWM current to control a light-emitting brightness of the first diode and control a light-emitting brightness of the third diode; and
a DC signal generator configured to generate the first DC current to control a light-emitting brightness of the second diode, and configured to generate the second DC current to control a light-emitting brightness of the fourth diode;
a first control circuit coupled to the second diode; and
a second control circuit configured to control the first control circuit to enable or disable the second diode,
wherein in a first operation mode of the display device, the second control circuit controls the first control circuit, in response to the first operation mode, to enable the second diode simultaneously with the first diode to emit light to illuminate a display region of the display device, and
in a second operation mode, different from the first operation mode, of the display device, the second control circuit controls the first control circuit to disable the second diodes and the first diode emits light to illuminate the display region of the display device.

16. The display device of claim 15, wherein the display region is a sub-picture region in a display screen of the display device.

17. The display device of claim 15, wherein the backlight module further comprises:
a third control circuit configured to generate and output the PWM current, in response to a first control signal, to the first diode;
wherein the first control circuit is configured to generate and output the DC current, in response to a second control signal, to the second diode and
the second control circuit is configured to generate the first and second control signals in response to a third control signal, wherein the third control signal is associated with switching the operation mode of the display device.

18. The display device of claim 15, wherein the DC current is less than the PWM current.

\* \* \* \* \*